No. 658,374. Patented Sept. 25, 1900.
J. N. JOHNSON.
STREET CAR ADVERTISING DEVICE.
(Application filed Oct. 24, 1898.)
(No Model.)
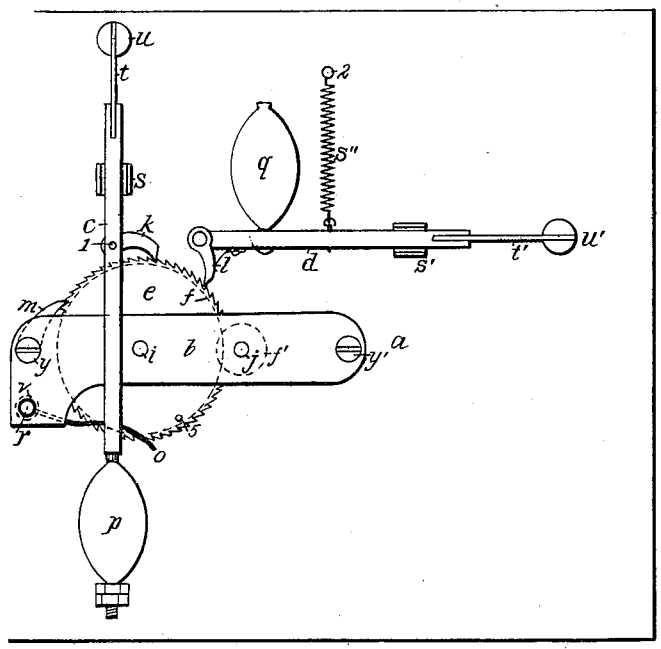
Fig. I.
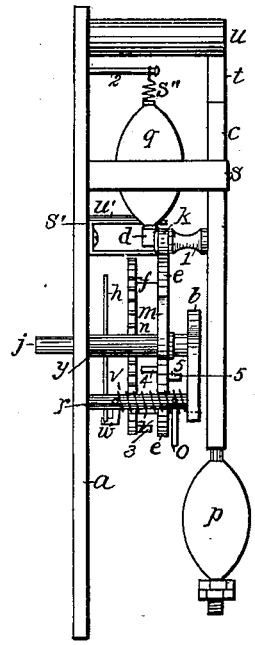
Fig. II.
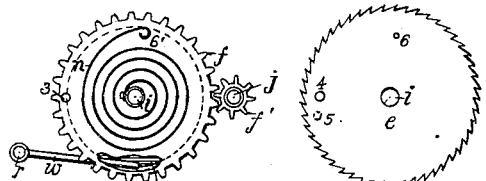
Fig. III.
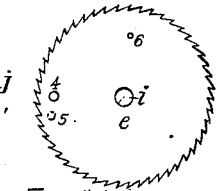
Fig. IV.
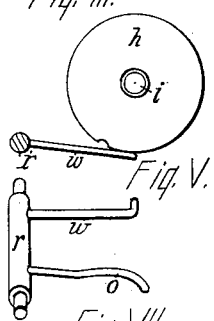
Fig. V.
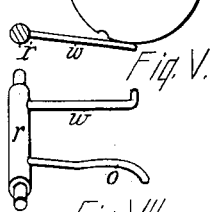
Fig. VIII.
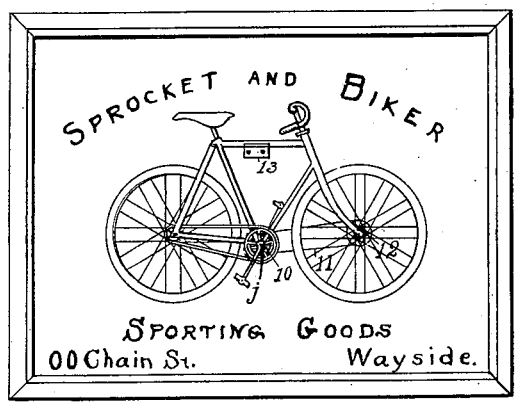
Fig. VIII.
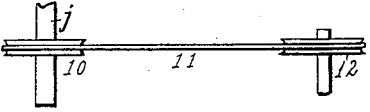
Fig. IX.
WITNESS
INVENTOR
John Nicholson Johnson
BY
H. Anderson
ATTORNEY
THE NORRIS PETERS CO., PHOTO-LITHO., WASHINGTON, D. C.

UNITED STATES PATENT OFFICE.

JOHN NICHOLSON JOHNSON, OF PRESCOTT, ARIZONA TERRITORY.

STREET-CAR ADVERTISING DEVICE.

SPECIFICATION forming part of Letters Patent No. 658,374, dated September 25, 1900.

Application filed October 24, 1898. Serial No. 694,394. (No model.)

*To all whom it may concern:*

Be it known that I, JOHN NICHOLSON JOHNSON, a citizen of the United States, and a resident of Prescott, in the county of Yavapai and Territory of Arizona, have invented certain new and useful Improvements in Street-Car Advertising Devices, of which the following is a specification.

This invention relates to devices adapted to attracting the notice of people to advertisements; and its object is to utilize the jolting of vehicles, such as horse-cars, for the storage of power that will at intervals set in motion some mechanical attraction.

The object is attained by the means set forth in this specification and in the accompanying drawings.

Figure I is a front elevation of the mechanism, and Fig. II represents an end elevation of the same. Figs. III, IV, V, VI, VII, and IX are details of the several parts. Fig. VIII represents an application of the device for giving motion to a bicycle as an attraction to an advertisement.

Reference will first be made to Figs. I and II, in which $p$ $q$ represent weights, attached, respectively, to levers $c$ $d$, which are secured in the manner of pendulums to fixed points $u$ $u'$ by means of springs $t$ $t'$. The lever $d$ is provided with a counterbalancing-spring $s''$, so that its normal position would be in a horizontal plane, poised between the springs $s'$, Figs. I and II. The purpose of springs $s'$ is to ease and limit the range of vertical vibration of the lever. The lever $c$ is likewise provided with similar springs, as at $s$, which limit the horizontal vibration of the lever. It is obvious that any violent jarring of the weights $p$ $q$ will cause them to vibrate, and by means of pawls $k$ on lever $c$ and $l$ on lever $d$ they will cause the turning of the ratchet-toothed wheel $e$, which will be prevented from turning backward by the fixed pawl $m$.

The wheel $e$ is placed loosely on axle $i$. (See Fig. VI.) The reverse side of wheel $e$ is shown in Fig. IV. A toothed wheel $f$, Figs. II, III, and IV, and a disk $h$, Figs. II, V, and VI, are made fast to the axle $i$. A spring $n$, Figs. II, III, and VI, is placed between the wheels $e$ and $f$, the inner end being fast to the axle, as in Fig. III, and the outer end $6'$ caught upon a pin $6$, which is fast to wheel $e$, as in Fig. VI. When the wheel $f$ is held stationary and the wheel $e$ is turned to the right, the spring $n$ will be wound up. When the axle $i$ is thus furnished with wheels $f$ $e$ and disk $h$ and spring $n$, it is inserted in a suitable frame, as front plate $a$ and plate $b$, adapted in size and shape to the mechanism it is to confine.

Adjacent to the axle $i$ is a rock-shaft $r$, provided with two levers $w$ and $o$, Fig. VII. The lever $w$ extends to the edge of the disk $h$, where a right-angular turn on the end engages with a notch in the disk. The notch and lever are shown as engaged in Fig. III and is disengaged in Fig. V. The other lever $o$ extends to the side of the wheel $e$, where it is subject to engagement with the pin $5$, Fig. I. So long as the pin $5$ and lever $o$ are not in contact the lever $w$ holds stationary the let-off disk $h$ and the wheel $f$. When the axle $i$ and shaft $r$ have their respective parts in position, the lever $w$ will find engagement with the notch in the disk, the light spring $v$ keeping it so, and while the pawl $m$ will prevent the wheel $e$ turning backward said wheel may be turned forward, winding up the spring. When the pin $5$ in wheel $e$ reaches the lever $o$ and depresses it, the lever $w$ will be released from the notch in the disk and the wound-up spring will cause the wheel $f$ to revolve. In order to keep more or less constant tension on the spring and to control the revolutions of the disk $h$, pins $3$ $4$, Fig. VI, are placed respectively on wheels $f$ $e$, equal distances from the center of the axle and adapted to meet each other, so that the pin on wheel $e$ serves as a stop to the pin on wheel $f$, thus limiting the wheel $f$ to a single revolution each time it may be released.

The wheel $e$ is revolved by the impulses against its periphery of the pawls on the two levers, and at each revolution of wheel $e$ wheel $f$ will be released and make one revolution. As a means of utilizing this storage of power I will now describe the additional features of the device shown. A pinion $f'$, Figs. I and III, is fixed on a spindle $j$, and this spindle is carried to the front of the plate $a$, Figs. II and VIII. Upon this plate is mounted a miniature bicycle by a bracket $13$, Figs. VIII. The spindle $j$ is made a part of or is attached to the crank-axle of the bicycle, and behind the sprocket-wheel I attach a small round belt-pulley 10, Fig. IX. Then a small belt-pulley 12, Fig. IX, is attached to the axle of the front bicycle-wheel, and the two pulleys are connected by means of a small belt 11, Figs. IX and VIII. Now it will be apparent that at each revolution of the wheel $f$, through the pinion $f'$ and parts described, the bicycle will be put in motion and will so continue during the revolution of the wheel $f$.

If this device be mounted in a suitable case, as in Fig. VIII, having the bicycle as the central feature of a sign, the intermittent running of the bicycle without any visible means of propulsion will become an object of interest. By placing the case thus prepared in a street-car or any vehicle subject to jerking movements the bicycle will be kept running, with intervals of remaining stationary hardly longer than the intervals required for rewinding.

The form and arrangements of the parts herein shown are susceptible of many modifications, and the principle is adapted for larger applications, so that I do not wish to be confined to the specific forms or applications herein shown so long as in the embodiment of the invention I adhere to its principles.

Having described my invention, what I claim, and desire to secure by Letters Patent of the United States, is—

1. In a device of the character described and in combination, a spring-winding mechanism, a jolt-vibrated lever mounted in vertical relation thereto, a second jolt-vibrated lever mounted in horizontal relation thereto, and means between the said levers and the winding mechanism whereby both the upward and longitudinal jolts or vibrations of the vehicle are utilized to wind up the spring, substantially as described.

2. In a device of the character described and in combination, the notched disk $h$ fast to the shaft $i$, lever-arm $w$ fast to rock-shaft $r$ and adapted to coöperate with the notched disk, lever-arm $o$ fast to said shaft $r$, the wheel $e$ loose upon the shaft $i$, having a tripping-pin thereon, the lever-arm $o$ being adapted to coöperate with the said pin, and a spring $v$ surrounding the shaft $r$ and constructed and arranged to uphold the lever-arms substantially as described.

3. The combination with the device for utilizing the vibration of vehicles for the storage of power in the manner described, the pinion $f'$ on shaft $j$ engaging with the wheel $f$, shaft $j$ attached to the axle of a miniature bicycle, said bicycle being attached to the frame of the device, and a belt and pulleys for imparting movement to the rear bicycle-wheel, substantially as herein shown and described.

Signed at Prescott, in the county of Yavapai and Territory of Arizona, this 18th day of June, A. D. 1898.

JOHN NICHOLSON JOHNSON.

Witnesses:
WARREN E. DAY,
W. W. ROSS,
H. S. LATHAM.